(12) United States Patent
Matsuo et al.

(10) Patent No.: US 11,443,869 B2
(45) Date of Patent: Sep. 13, 2022

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Yuki Matsuo, Mie (JP); Tetsuya Nishimura, Mie (JP); Ryuta Takakura, Mie (JP); Masaki Mizushita, Mie (JP); Haruka Nakano, Mie (JP); Yuya Fukami, Mie (JP); Suguru Yasuda, Mie (JP); Hitoshi Hasegawa, Mie (JP); Kenta Arai, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/056,585

(22) PCT Filed: Feb. 25, 2019

(86) PCT No.: PCT/JP2019/006963
§ 371 (c)(1),
(2) Date: Nov. 18, 2020

(87) PCT Pub. No.: WO2019/225095
PCT Pub. Date: Nov. 28, 2019

(65) Prior Publication Data
US 2021/0210249 A1    Jul. 8, 2021

(30) Foreign Application Priority Data

May 25, 2018 (JP) .............................. JP2018-100720

(51) Int. Cl.
*H01B 7/08* (2006.01)
*H01B 7/00* (2006.01)
*B60R 16/03* (2006.01)

(52) U.S. Cl.
CPC ......... *H01B 7/0838* (2013.01); *H01B 7/0045* (2013.01); *H01B 7/0853* (2013.01); *B60R 16/03* (2013.01)

(58) Field of Classification Search
CPC .......... H01B 7/02; H01B 7/04; H01B 7/0838; H01B 7/0045; H01B 7/08; H01B 7/0853; H01B 11/06
(Continued)

(56) References Cited

U.S. PATENT DOCUMENTS 2,951,111 A * 8/1960 Anderson .............. H01B 7/292
174/117 R
3,128,214 A * 4/1964 Lay ...................... H01B 13/012
264/258

(Continued)

FOREIGN PATENT DOCUMENTS

CN 101151684 3/2008
CN 103415896 11/2013
(Continued)

OTHER PUBLICATIONS

International Search Report (ISR) issued in International Patent Application No. PCT/JP2019/006963, dated Apr. 2, 2019, together with an English translation thereof.
(Continued)

*Primary Examiner* — William H. Mayo, III
(74) *Attorney, Agent, or Firm* — Greenblum & Bernstein, P.L.C.

(57) ABSTRACT

A wiring member includes a plurality of wire-like transmission members each including a transmission wire body and
(Continued)

a coat covering the transmission wire body and a flattening member keeping the plurality of wire-like transmission members in a flat state. For example, the flattening member is considered to include a first flattening member which is a member formed separately from the plurality of wire-like transmission members.

11 Claims, 7 Drawing Sheets

(58) Field of Classification Search
USPC ...... 174/110 R, 113 R, 117 R, 117 F, 117 FF
See application file for complete search history.

(56) References Cited

U.S. PATENT DOCUMENTS

| | | | | |
|---|---|---|---|---|
| 3,663,739 | A * | 5/1972 | Chevrier | H01B 7/08 174/36 |
| 4,012,577 | A * | 3/1977 | Lang | H01B 7/0876 174/34 |
| 4,625,074 | A * | 11/1986 | Cox | H01B 7/0823 174/117 F |
| 5,276,759 | A * | 1/1994 | Nguyen | H01B 7/0846 156/55 |
| 5,327,513 | A * | 7/1994 | Nguyen | G02B 6/4403 156/55 |
| 5,422,439 | A * | 6/1995 | Grove | H01B 7/0846 156/289 |
| 5,502,287 | A * | 3/1996 | Nguyen | H01B 7/0838 156/53 |
| 6,043,434 | A * | 3/2000 | Prudhon | H01B 7/0009 174/113 R |
| 6,323,428 | B1 * | 11/2001 | Takano | B60R 16/0215 174/117 F |
| 6,392,155 | B1 * | 5/2002 | Shimizu | H01B 7/0838 174/117 F |
| 6,635,826 | B2 * | 10/2003 | Yamamoto | H01B 7/0876 174/117 F |
| 7,066,246 | B2 * | 6/2006 | Pauchet | H01B 7/0072 166/65.1 |
| 7,807,927 | B2 * | 10/2010 | Yeh | H01B 7/0838 174/110 R |
| 8,598,461 | B2 * | 12/2013 | Lind | H02G 3/32 174/117 F |
| 9,431,784 | B2 * | 8/2016 | Huang | H01R 43/28 |
| 10,398,873 | B1 * | 9/2019 | Kyllonen | A61M 25/0009 |
| 10,460,855 | B2 * | 10/2019 | Yan | B21B 31/32 |
| 2006/0157267 | A1 * | 7/2006 | Morijiri | H01B 11/203 174/117 F |
| 2008/0185168 | A1 * | 8/2008 | Matsukawa | H01B 11/203 174/117 F |
| 2009/0258787 | A1 * | 10/2009 | Wilkie | H01L 39/2487 505/231 |
| 2012/0261185 | A1 * | 10/2012 | Murao | H01B 7/08 174/72 A |
| 2014/0000962 | A1 | 1/2014 | Uehara et al. | |
| 2014/0182890 | A1 * | 7/2014 | Gross | H01B 7/0861 174/251 |

FOREIGN PATENT DOCUMENTS

| | | |
|---|---|---|
| CN | 104217800 | 12/2014 |
| CN | 104347162 | 2/2015 |
| CN | 105825927 | 8/2016 |
| CN | 206117027 | 4/2017 |
| CN | 206452061 | 8/2017 |
| JP | 62-31810 U | 2/1987 |
| JP | 2010-259297 | 11/2010 |
| JP | 2011-259563 | 12/2011 |
| JP | 2014-11910 | 1/2014 |
| JP | 2014-232685 | 12/2014 |
| JP | 2015-53262 | 3/2015 |
| JP | 2016-140203 | 8/2016 |
| WO | 2012/120640 | 9/2012 |

OTHER PUBLICATIONS

International Preliminary Report on Patentability (IPRP) issued in International Patent Application No. PCT/JP2019/006963, dated Nov. 26, 2020, together with an English translation thereof.

Japan Official Action issued in Japan Patent Application No. 2018-100720, dated Apr. 27, 2021, together with English translation thereof.

China Official Action issued in China Patent Application No. 201980033394.1, dated Oct. 11, 2021, together with English translation thereof.

* cited by examiner

WIRING MEMBER

TECHNICAL FIELD

The present disclosure relates to a wiring member.

BACKGROUND ART

In a wiring member transmitting electrical power to a component mounted to a vehicle, a plurality of wire-like transmission members are normally bundled to have a round shape in cross section and mounted to a vehicle.

In the meanwhile, a space for arranging the wiring member in the vehicle tends to decreases. It is difficult in some cases to arrange the wiring member bundled to have the round shape in cross section in a narrow space. Thus, flattening of a wiring member is desired so that the wiring member can be disposed in a narrow space in a vehicle.

There is a flexible flat cable (FFC) or a flexible printed circuit (FPC), for example, as a wiring member flatly formed in this manner (for example, refer to Patent Document 1).

PRIOR ART DOCUMENTS

Patent Documents

Patent Document 1: Japanese Patent Application Laid-Open No. 2014-11910

SUMMARY

Problem to be Solved by the Invention

However, the FFC and FPC described above have a low degree of freedom for a transmission route and hardly cope with a design change, for example, thus are of limited location to be applicable.

Accordingly, an object of the present invention is to provide a flat wiring member applicable to a wider range.

Means to Solve the Problem

A wiring member according to the present disclosure is a wiring member including a plurality of wire-like transmission members each including a transmission wire body and a coat covering the transmission wire body and a flattening member keeping the plurality of wire-like transmission members in a flat state.

Effects of the Invention

According to the present disclosure, a flat wiring member applicable to a wider range can be provided.

DESCRIPTION OF EMBODIMENT(S)

[Description of Embodiment of Present Disclosure]

Embodiments of the present disclosure are listed and described firstly.

A wiring member according to the present disclosure is as follows.

(1) A wiring member according to the present disclosure is a wiring member including a plurality of wire-like transmission members each including a transmission wire body and a coat covering the transmission wire body and a flattening member keeping the plurality of wire-like transmission members in a flat state.

A flat wiring member can be formed using a general-purpose wire-like transmission member. At this time, a length and a route of each wire-like transmission member and the number of the wire-like transmission members can be easily set, thus the wiring member can be applied to a wider range.

(2) It is sufficient that the plurality of wire-like transmission members are divided into a plurality of groups each including one or a plurality of wire-like transmission members, and at least one group including a plurality of wire-like transmission members in the plurality of groups is bundled by a banding material. The reason is that a flat state of the plurality of wire-like transmission members can be maintained.

(3) It is sufficient that the flattening member includes a first flattening member which is a member formed separately from the plurality of wire-like transmission members. The reason is that the wiring member can be easily manufactured compared with a case where the flattening member is an integrally molded component.

(4) It is sufficient that the first flattening member includes a sheet material having flexibility capable of being bent in a thickness direction and sandwiching the plurality of wire-like transmission members. The reason is that the flattened wiring member can be bent.

(5) It is sufficient that the wiring member further includes a reinforcement member reinforcing a part of a portion flattened by the sheet material. The reason is that the flattening by the sheet material can be easily maintained.

(6) It is sufficient that the first flattening member includes a grooved housing member in which a plurality of grooves housing some of the plurality of wire-like transmission members are formed. The reason is that a flattening and a positioning of the wire-like transmission member can be performed together.

(7) It is sufficient that the first flattening member includes a route regulation member having stiffness capable of regulating routes of the plurality of wire-like transmission members. The reason is that a flattening and a route regulation can be performed together.

(8) It is sufficient that the first flattening member includes a banding connection member binding and connecting each group while dividing the plurality of wire-like transmission members into a plurality of groups. The reason is that the plurality of wire-like transmission members can be divided into groups and flattened.

(9) It is sufficient that the flattening member includes a second flattening member which is a member molded in a state where the plurality of wire-like transmission members are embedded in the second flattening member. The flattening member hardly comes out from the wire-like transmission member compared with the case where the flattening member is formed separately.

[Details of Embodiment of Present Disclosure]

Specific examples of a wiring member of the present disclosure are described hereinafter with reference to the drawings. The present invention is not limited to these examples, but is indicated by claims, and it is intended that meanings equivalent to claims and all modifications within a scope of claims are included.

[Embodiment 1]

Figure 1:
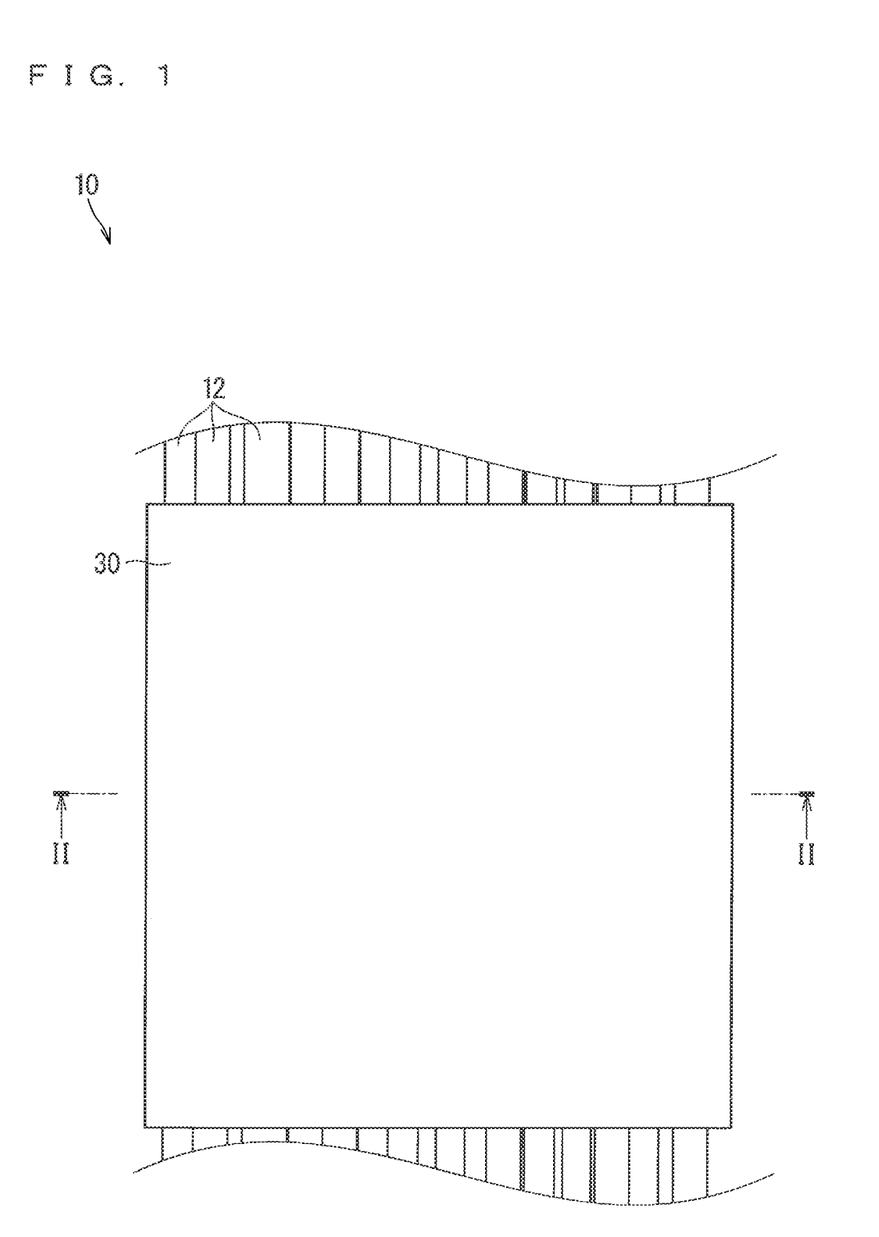
FIG. 1 is a plan view illustrating a wiring member according to an embodiment 1.
Figure 2:
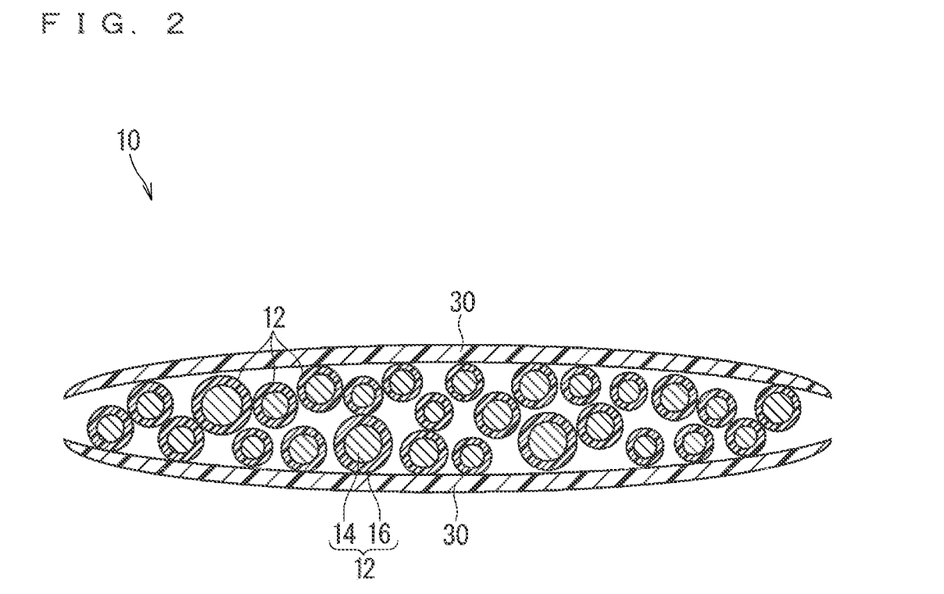
FIG. 2 is a cross-sectional view of the wiring member cut along a II-II line in FIG. 1.

A wiring member according to an embodiment 1 is described hereinafter. FIG. 1 is a plan view illustrating a wiring member 10 according to the embodiment 1. FIG. 2 is a cross-sectional view of the wiring member cut along a II-II line in FIG. 1.

The wiring member 10 is a member joined to a component mounted to the vehicle to transmit electrical power or light to and/or from the component. The wiring member 10 includes a plurality of wire-like transmission members 12 and a flattening member.

It is sufficient that the wire-like transmission member 12 is a wire-like member transmitting electrical power or light. Each wire-like transmission member 12 includes a transmission wire body 14 transmitting electrical power or light and a coat 16 covering the transmission wire body 14. For example, the wire-like transmission member 12 may be a general wire having a core wire and a covering around the core wire, or may also be a shielded wire, an enamel wire, a nichrome wire, or an optical fiber. The wire-like transmission member 12 transmitting the electrical power may be various kinds of signal wires or various kinds of power wires.

In the description herein, the wire-like transmission member 12 is a general wire 12 (simply referred to as the electrical wire 12 hereinafter). That is to say, the electrical wire 12 includes a core wire 14 as the transmission wire body 14 and an insulating covering 16 as the coat 16 covering the transmission wire body 14.

The core wire 14 is made up of one or a plurality of strands. The strand is formed of a conductor made of copper, copper alloy, aluminum, or aluminum alloy, for example. When the core wire 14 is made up of the plurality of strands, the plurality of strands are preferably stranded. The insulating covering 16 is formed of a resin material such as polyvinyl chloride (PVC) or polyethylene (PE) extrusion-molded around the core wire 14. Herein, the electrical wire 12 is a so-called round wire having a round shape in cross section.

The flattening member is a member keeping the plurality of wire-like transmission members 12 in a flat state. It is sufficient to use, as such a flattening member, at least one of the first flattening member which is the member formed separately from the plurality of wire-like transmission members 12 and the second flattening member which is the member molded in the state where the plurality of wire-like transmission members 12 are embedded in the second flattening member. The wiring member 10 indicates a case where a sheet material 30 is used as the first flattening member.

The plurality of electrical wires 12 have parts flatly disposed side by side. The parts of the plurality of electrical wires 12 flatly disposed side by side are sandwiched by the sheet material 30 to be maintained in this state.

The sheet material 30 sandwiches the plurality of wire-like transmission members 12 in the flat state, thereby keeping the plurality of wire-like transmission members 12 in the flat state.

The sheet material 30 has flexibility capable of being bent in a thickness direction. A soft resin sheet material such as non-rigid PVC or foam resin, an elastomer sheet material such as silicon rubber or natural rubber, a sheet material made up of a non-woven cloth, a woven cloth, or a knitted cloth, for example, can be used as the sheet material 30.

A region where one sheet material 30 covers the electrical wire 12 along the longitudinal direction of the electrical wire 12 may be appropriately set. For example, the region where one sheet material 30 covers the electrical wire 12 along the longitudinal direction of the electrical wire 12 is considered to be equal to or larger than 100 millimeters.

A connector, for example, is provided on an end portion of the electrical wire 12, and the connector is connected to a partner connector provided on a component to which the wiring member 10 is connected. The connector is formed by housing the end portion of the electrical wire 12 in an electrical wire housing part of a housing. In the example illustrated in FIG. 1, the end portion of the electrical wire 12 extends to an outer side of the sheet material 30, however, the end portion of the electrical wire 12 may be sandwiched by the sheet material 30. In this case, the housing may be or may not be directly fixed to the sheet material 30.

In the example illustrated in FIG. 2, the plurality of wire-like transmission members 12 are sandwiched by the plurality of separated sheet materials 30, however, this configuration is not necessary. It is also applicable to bend one sheet material to sandwich the plurality of wire-like transmission members 12. When one sheet material is bent to sandwich the plurality of wire-like transmission members 12, it is also considered that the plurality of wire-like transmission members 12 are wrapped by one sheet material.

In the example illustrated in FIG. 2, there is only one stage of members wrapped by the sheet material 30, however, this configuration is not necessary. Plural stages of the members wrapped by the sheet material 30 may be stacked.

A means of positioning the electrical wire 12 and the first flattening member (the sheet material 30 herein) is not particularly limited, however, various types of positioning means can be adopted. At this time, only one type of positioning means may be adopted, or plural types of positioning means may be used together in some cases.

Considered as the positioning means is that an adhesive tape is wound around end portion of the sheet material 30 and the electrical wire 12 extending from the end portion of the sheet material 30. For example, a banding member such as an adhesive tape or a banding band is considered to be wound around the sheet material 30. For example, it is considered that a gluing agent or an adhesive agent is provided on an inner surface of the sheet material 30, and inner surfaces of the sheet material 30 and/or the sheet material 30 and the electrical wire 12 are bonded to each other. When the inner surfaces of the sheet material 30 are bonded to each other, it is considered that the inner surfaces on edge portions of the sheet material 30 and/or the inner surfaces of intermediate portions of the sheet material 30 are bonded to each other.

The positioning means of the electrical wire 12 and the first flattening member can also be appropriately adopted in each embodiment described hereinafter as far as there is no particular contradiction, for example.

According to the wiring member 10 having the configuration described above, the flat wiring member 10 can be formed using the general-purpose wire-like transmission member 12. At this time, a length and a route of each wire-like transmission member 12 and the number of the wire-like transmission members 12 can be easily set, thus the wiring member 10 can be applied to a wider range.

The flattening member includes the first flattening member formed separately from the electrical wire 12, thus the wiring member 10 can be easily manufactured compared with a case where the flattening member is a component integrally molded with the electrical wire 12.

The sheet material 30 is adopted as the first flattening member, thus the flattened wiring member 10 can be bent.

[Modification Example of Embodiment 1]

Figure 3:
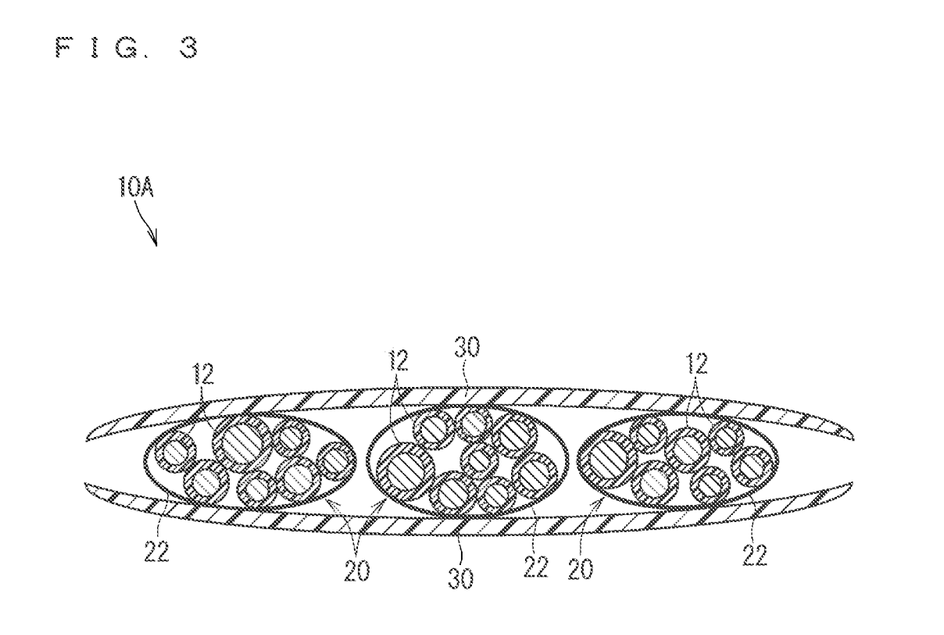
FIG. 3 is a cross-sectional view illustrating a modification example of the wiring member according to the embodiment 1.

A modification example of the wiring member 10 according to the embodiment 1 is described herein. FIG. 3 is a cross-sectional view illustrating the modification example of the wiring member 10 according to the embodiment 1.

In a wiring member 10A according to the modification example, the plurality of wire-like transmission members 12 are divided into a plurality of groups 20. Each group 20 includes one or plurality of wire-like transmission members 12. At least one group 20 including the plurality of wire-like transmission members 12 in the plurality of groups 20 is bundled by a banding member 22.

In the example illustrated in FIG. 3, the plurality of wire-like transmission members 12 are divided into three groups 20. Each of the three groups 20 includes the plurality of wire-like transmission members 12. Each of the three groups 20 is banded by the banding member 22 different from each other.

The banding member 22 is not particularly limited, however, various banding members 22 such as an adhesive tape and a banding band, for example, can be adopted. At this time, only one type of banding member 22 may be adopted, or plural types of banding members 22 may be used together in some cases.

In the example illustrated in FIG. 3, all of the three groups 20 include the plurality of wire-like transmission members 12, however, this configuration is not necessary. There may be the group including only one wire-like transmission member 12. The group 20 including only one wire-like transmission member 12 is not normally banded by the banding member 22.

In the example illustrated in FIG. 3, all of the three groups 20 including the plurality of wire-like transmission members 12 are banded by the banding member 22, however, this configuration is not necessary. Some of the groups 20 in the plurality of groups 20 including the plurality of wire-like transmission members 12 may not be banded in some cases. However, as the example illustrated in FIG. 3, the wiring member 10A preferably includes the plurality of banded groups 20.

When there is the group 20 which is not banded in the wiring member, the group 20 is located adjacent to the banded group 20. From another viewpoint, when there is at least one wire-like transmission member 12, which is not banded, adjacent to one side of the banded group 20, this at least one wire-like transmission member 12 which is not banded can be considered to be divided into one group 20. At this time, it is also considered that the position of the group 20 which is not banded is located between the banded groups 20, or located on an end of the groups 20 disposed side by side. For example, in the example illustrated in FIG. 3, there may be a case where the middle group 20 is the group which is not banded, or there may also be a case where the group 20 located at the end is the group which is not banded.

According to such a wiring member 10A, the plurality of wire-like transmission members 12 are divided into the plurality of groups 20, and at least one group 20 is bundled by the banding member 22, thus the flat state of the plurality of wire-like transmission members 12 can be easily maintained.

Also in each embodiment described hereinafter, there may be a case where the plurality of wire-like transmission members 12 are not banded in the manner similar to the wiring member 10 described above, or there may also be a case where the plurality of wire-like transmission members 12 are banded in the manner similar to the present wiring member 10A.

[Embodiment 2]

Figure 4:
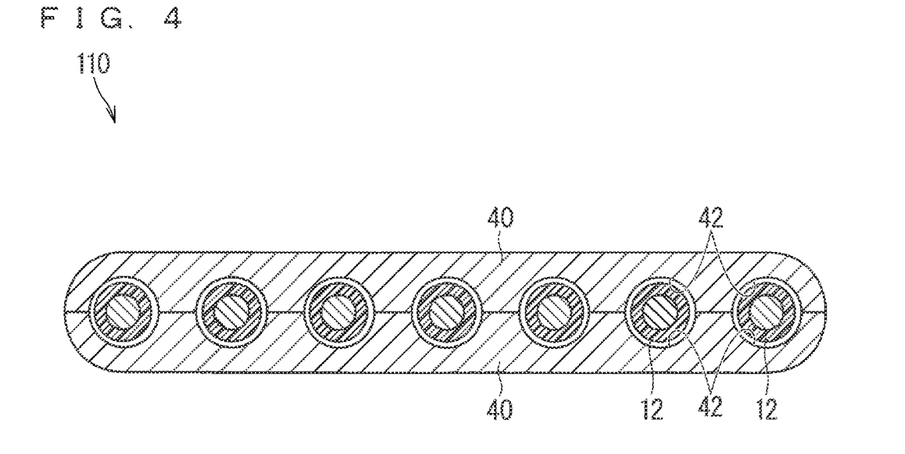
FIG. 4 is a cross-sectional view illustrating a wiring member according to an embodiment 2.

A wiring member according to an embodiment 2 is described. FIG. 4 is a cross-sectional view illustrating a wiring member 110 according to the embodiment 2. In the description of the present embodiment, the same reference numerals are assigned to the similar constituent elements described above, and the description thereof will be omitted. The same applies to each embodiment described hereinafter.

This wiring member 110 indicates a case where a grooved housing member 40 is used as the first flattening member.

A plurality of grooves 42 are formed in the grooved housing member 40. Some of the plurality of wire-like transmission members 12 are housed in each groove 42.

In the example illustrated in FIG. 4, the grooved housing member 40 is formed into flat plate-like shape. The groove 42 is formed in one main surface of the grooved housing member 42. The groove 42 is formed into a semicircular shape in cross section. The two grooved housing members 40 are overlapped with each other so that grooves 42 therein face each other. Accordingly, the wire-like transmission member 12 is housed in a part where the grooves 42 of the two grooved housing members 40 are coupled to form a circular close space in cross section.

A material constituting the grooved housing member 40 is not particularly limited, however, resin, wood, and metal, for example, can be adopted as the material. More specifically, PE, PVC, polyurethane (PU), polypropylene (PP), polyethylene terephthalate (PET), rubber, and silicone, for example, can be used as the material. At this time, the grooved housing member 40 may be formed to be easily bent or may be formed to have stiffness capable of regulating the route.

In the example illustrated in FIG. 4, the groove 43 is formed only one main surface of the grooved housing member 40, however, this configuration is not necessary. The grooves 42 may be formed in both main surfaces of the grooved housing member 40.

In the example illustrated in FIG. 4, the two grooved housing members 40 are overlapped with each other, however, this configuration is not necessary. For example, only one grooved housing member 40 may be provided. The three or more grooved housing members 40 may be overlapped with each other. When three or more grooved housing members 40 are overlapped with each other, it is sufficient that the grooves 42 are formed in both the main surfaces of the grooved housing member 40 located in the middle.

In the example illustrated in FIG. 4, the wire-like transmission member 12 is housed in the part of the close space in cross section, however, this configuration is not necessary. The wire-like transmission member 12 may be housed in a space partially opened in a circumferential direction. For example, when only one grooved housing member 40 is provided, the wire-like transmission member 12 is housed in the groove 42, thus the wire-like transmission member 12 is housed in the space partially opened in the circumferential direction. For example, when the plurality of grooved housing members 40 are overlapped with each other, the groove 42 is formed in an outward main surface of the grooved housing member 40 located at the end, and the wire-like transmission member 12 is housed in the groove 42, thus the wire-like transmission member 12 is housed in the space partially opened in the circumferential direction.

In the example illustrated in FIG. 4, one wire-like transmission member 12 is housed in one groove 42, however, this configuration is not necessary. The plurality of wire-like transmission members 12 may be housed in one groove 42. At this time, there are the groove 42 housing one wire-like transmission member 12 and the groove 42 housing the plurality of wire-like transmission members 12 at the same time.

In the example illustrated in FIG. 4, all the plurality of grooves 42 are formed to have the same size, however, this configuration is not necessary. The groove 42 having the different size may be included.

According to such a wiring member 110, the wire-like transmission member 12 is housed in the grooved housing member 40, thus the flattening and the positioning of the wire-like transmission member 12 can be performed together.

[Embodiment 3]

Figure 5:
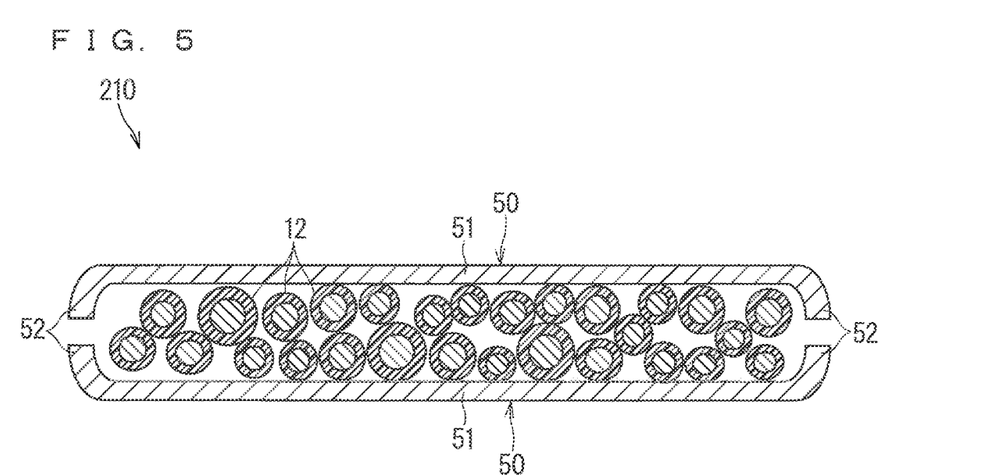
FIG. 5 is a cross-sectional view illustrating a wiring member according to an embodiment 3.

A wiring member according to an embodiment 3 is described. FIG. 5 is a cross-sectional view illustrating a wiring member 210 according to the embodiment 3.

This wiring member 210 indicates a case where a route regulation member 50 is used as the first flattening member. The route regulation member 50 has stiffness capable of regulating routes of the plurality of wire-like transmission members 12. It is sufficient that a material constituting the route regulation member is a hard material, and is not particularly limited. Hard resin such as PP, wood, and metal, for example, can be used as the material constituting the route regulation member.

In the example illustrated in FIG. 5, two route regulation members 50 are provided to sandwich the wire-like transmission member 12 therebetween. Each route regulation member 50 is formed into a gutter shape including a bottom part 51 formed into a plate-like shape and a sidewall part 52 standing on the bottom part 51. The two route regulation members 50 are provided to butt the sidewall parts 52. At this time, a height dimension of the sidewall part 52 is smaller than a width dimension of the bottom part 51, thus the wiring member 210 is flattened.

Figure 6:
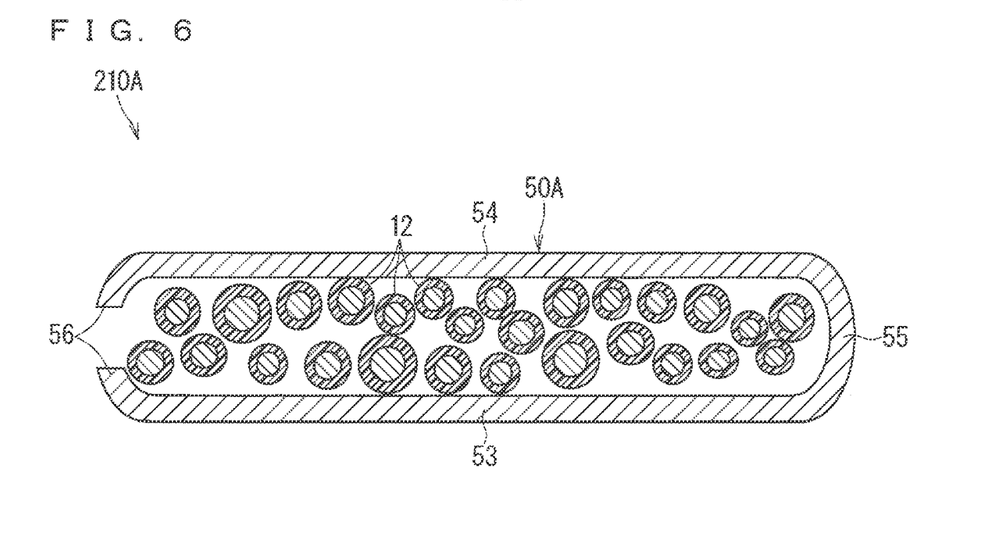
FIG. 6 is a cross-sectional view illustrating a modification example of the wiring member according to the embodiment 3.

Herein, FIG. 6 is a cross-sectional view illustrating the modification example of the wiring member 210 according to the embodiment 3.

In a wiring member 210A according to the modification example, a route regulation member 50A is formed into a shape of integrating the two route regulation members 50 described above. Specifically, the route regulation member 50A includes a bottom part 53, a cover part 54, a connection part 55, and a sidewall part 56. Each of the bottom part 53 and the cover part 54 is formed into a plate-like shape and face to each other at an interval so that main surfaces thereof face each other. The connection part 55 connects each edge part of the bottom part 53 and the cover part 54. The sidewall part 56 stands on each edge part of the bottom part 53 and the cover part 54 on a side opposite to the side where the connection part 55 is provided. Accordingly, the wire-like transmission member 12 can be housed in the route regulation member 50A from a part between the two sidewall parts 56. At this time, a height dimension of the connection part 55 is smaller than width dimensions of the bottom part 53 and the cover part 54, thus the route regulation member 50A is flattened.

According to the wiring members 210 and 210A each having the configuration described above, a flattening and a route regulation of the plurality of wire-like transmission members 12 can be performed together by the route regulation members 50 and 50A.

At this time, the wire member 210 can flexibly cope with increase and decrease in a cross-section area of the wire-like transmission member 12. In the meanwhile, according to the wiring member 210A, the number of components can be reduced.

[Embodiment 4]

Figure 7:
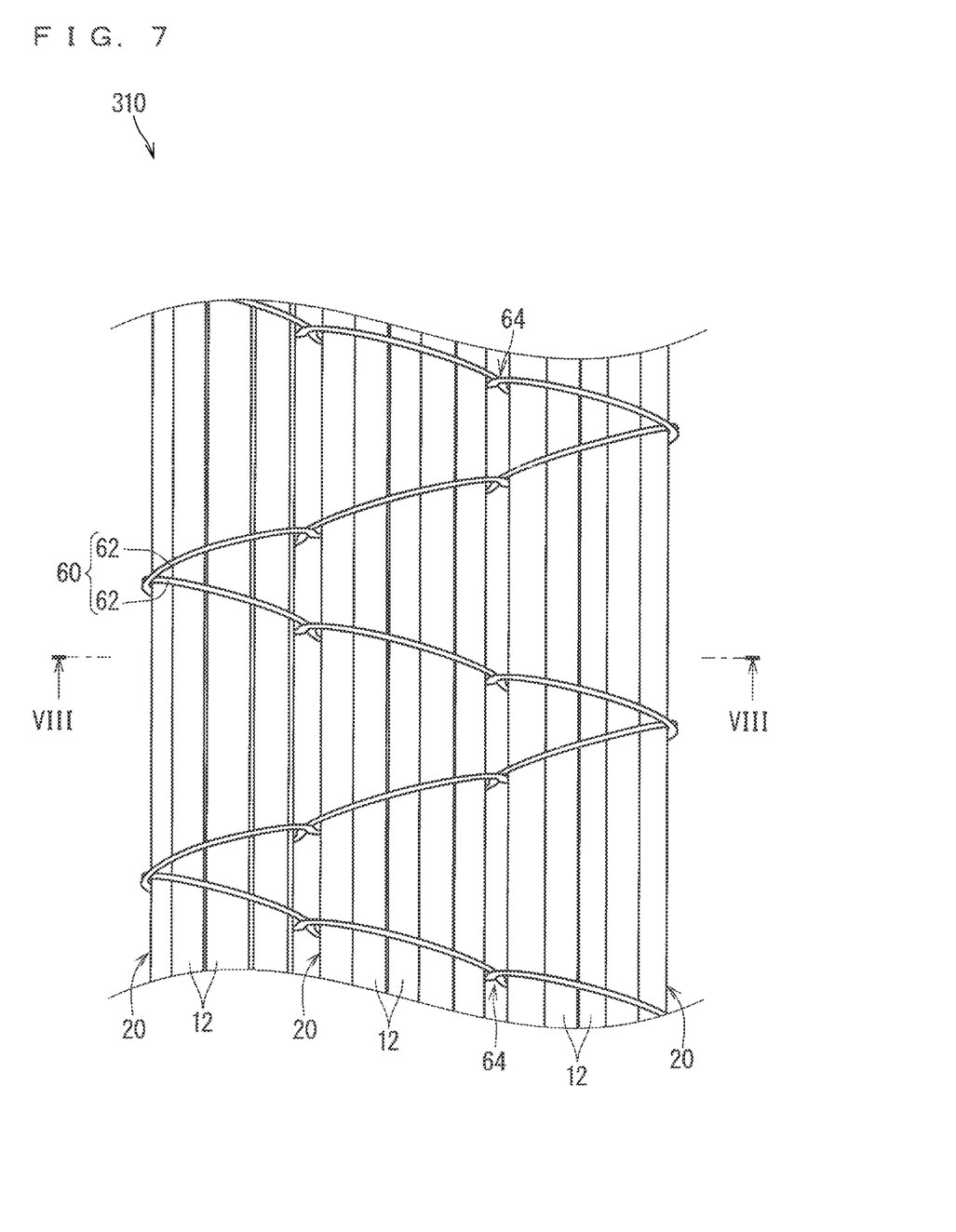
FIG. 7 is a plan view illustrating a wiring member according to an embodiment 4.
Figure 8:
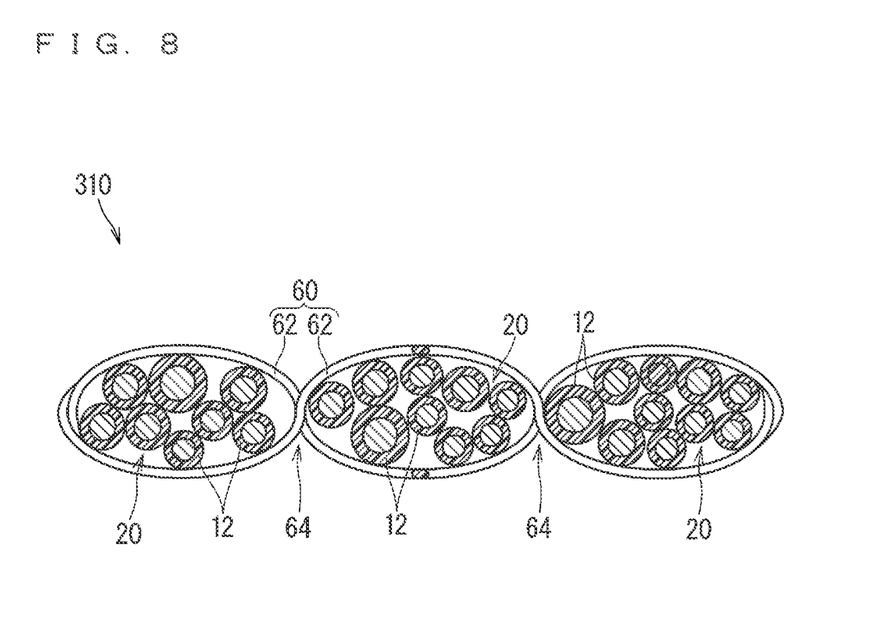
FIG. 8 is a cross-sectional view of the wiring member cut along a VIII-VIII line in FIG. 7.

A wiring member according to an embodiment 4 is described. FIG. 7 is a plan view illustrating a wiring member 310 according to the embodiment 4. FIG. 8 is a cross-sectional view of the wiring member 310 cut along a VIII-VIII line in FIG. 7.

This wiring member 310 indicates a case where a banding connection member 60 is used as the first flattening member. The banding connection member 60 binds and connects each group 20 while dividing the plurality of wire-like transmission members 12 into the plurality of groups 20. At this time, each group 20 includes one or plurality of wire-like transmission members.

More specifically, one banding connection member 60 is made up of one or a plurality of connection members 62. For example, a member referred to as a thread, a string, and a band can be generally used as the connection member 62. The connection member 62 extends over the plurality of groups 20 while binding each of the plurality of groups 20. At this time, the connection member 62 crosses between the adjacent groups 20 to form a crossing part 64. Accordingly, the banding connection member 60 binds and connects each group while dividing the plurality of wire-like transmission members 12 into the plurality of groups 20. The wiring member 310 made up of the plurality of wire-like transmission members 12 connected by the banding connection member 60 has a so-called blind shape.

A material of the connection member 62 is not particularly limited. For example the material of the connection member 62 may be natural fiber, synthetic resin, or rubber.

A shape of the connection member 62 is not particularly limited. For example, the shape of the connection member 62 may be one thread-like shape (string-like shape), a woven cloth or a knitted cloth made up of a plurality of woven threads or knitted threads, a braided string made up of a plurality of woven strings, or a non-woven cloth. When the connection member 62 includes a thread or a string, the thread or the string may be a mono-filament or a multi-filament. A cross-sectional shape of the connection member 62 may be a circular shape or a rectangular shape. At this time, the cross-sectional shape of the connection member 62 may be a flat shape.

A thickness of the connection member 62 is not particularly limited. For example, the thickness of the connection member 62 may be equal to a thickness of the wire-like transmission member 12, or also may be larger or smaller than that of the wire-like transmission member 12.

At this time, the connection member 62 preferably has the thickness, the flexibility, and the shape not to damage the wire-like transmission member 12 even when the connection member 62 binds the wire-like transmission member 12. Particularly, the connection member 62 preferably has the thickness, the flexibility, and the shape not to digging into the coat 16 of the wire-like transmission member 12.

In the example illustrated in FIG. 7, one banding connection member 60 passes between the plurality of groups 20 in a zig-zag manner along a longitudinal direction of the wire-like transmission member 12, thereby connecting the plurality of groups 20, however, this configuration is not necessary. One banding connection member 60 may connect the plurality of groups 20 in one position along the longitudinal direction of the wire-like transmission member 12. At this time, it is also applicable that the other banding connection member 60 divides the wire-like transmission members 12 into the plurality of groups 20 in each of a plurality of positions at intervals along the longitudinal direction of the wire-like transmission member 12, thereby connecting the plurality of groups 20.

According to such a wiring member 310, the plurality of wire-like transmission members 12 can be divided into groups 20 by the banding connection member 60, and also can be flattened.

[Embodiment 5]

Figure 9:
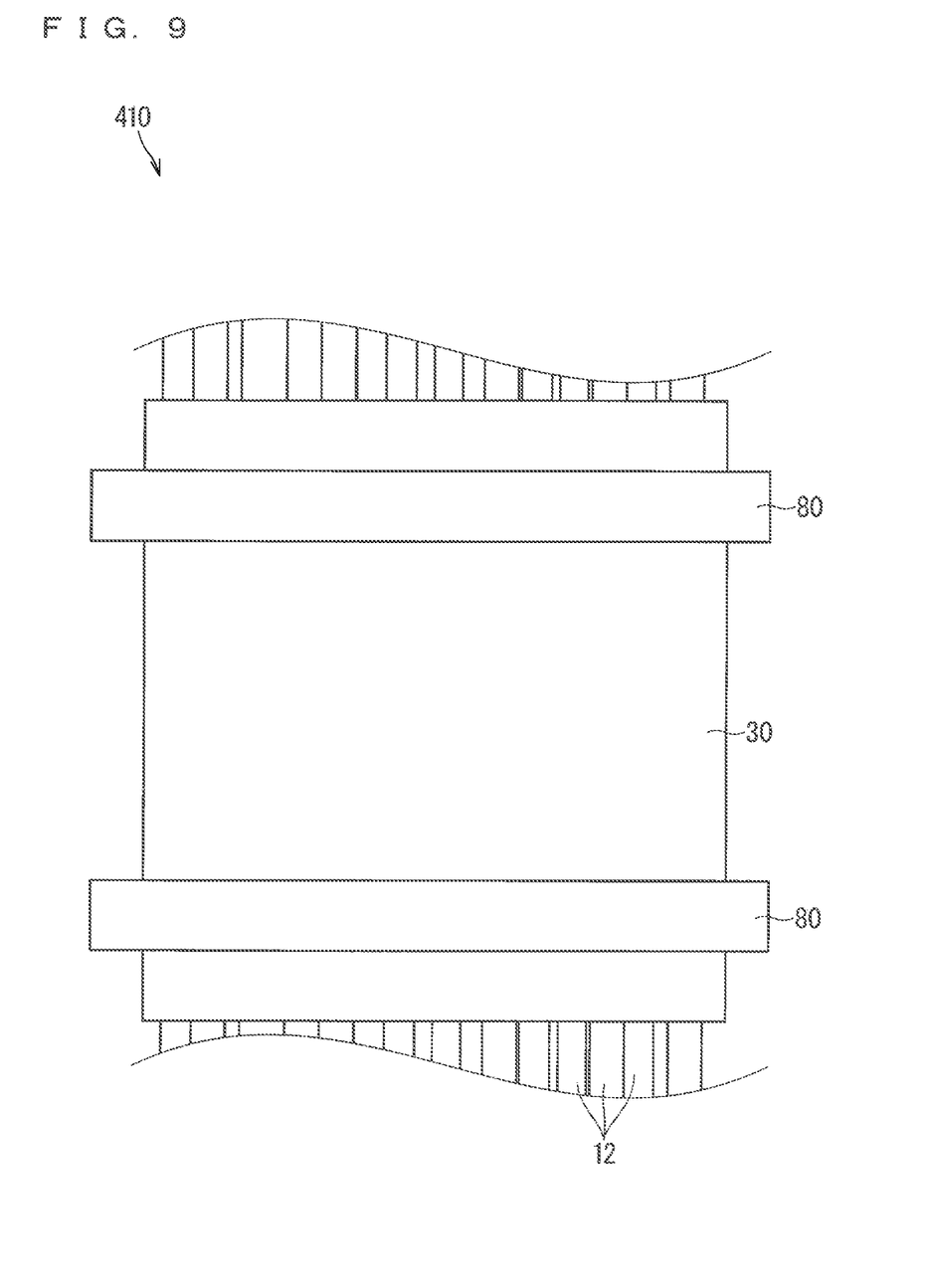
FIG. 9 is a cross-sectional view illustrating a wiring member according to an embodiment 5.

A wiring member according to an embodiment 5 is described. FIG. 9 is a cross-sectional view illustrating a wiring member 410 according to the embodiment 5.

The wiring member 410 is similar to the wiring member 10 according to the embodiment 1 in that the plurality of wire-like transmission members 12 are flattened by the sheet material 30. The wiring member 410 is different from the wiring member 10 in that the wiring member 410 further includes a reinforcement member 80.

The reinforcement member 80 reinforces a part flattened by the sheet material 30. The reinforcement member 80 is a member having higher stiffness than the sheet material 30. The reinforcement member 80 is formed to have a cross-sectional shape similar to the route regulation member 50 described above, for example. The reinforcement member 80 is provided to overlap with an outer side of the sheet material 30. More specifically, the part of the plurality of wire-like transmission members 12 flattened by the sheet material 30 is housed in a housing space of the reinforcement member 80.

The reinforcement member 80 reinforces a part of the plurality of wire-like transmission members 12 flattened by the sheet material 30. Accordingly, the reinforcement member 80 is formed so that a dimension along the longitudinal direction of the wire-like transmission member 12 is smaller than that of the sheet material 30.

The number of reinforcement members 80 provided on one part of the plurality of wire-like transmission members 12 flattened by the sheet material 30 is not particularly limited, thus one or a plurality of reinforcement members 80 may be provided. It is sufficient that the number of reinforcement members 80 is appropriately set in accordance with a necessary reinforcement form.

A position of the reinforcement member 80 provided on one part of the plurality of wire-like transmission members 12 flattened by the sheet material 30 is not particularly limited, thus the reinforcement member 80 can be located in a center or an end of the part. When the plurality of reinforcement members 80 are provided, the plurality of reinforcement members 80 may be provided adjacently along the longitudinal direction of the wire-like transmission member 12, or may be provided at intervals. It is sufficient that the position of the reinforcement member 80 is appropriately set in accordance with a necessary reinforcement form.

In the example illustrated in FIG. 9, the reinforcement member 80 is provided in two positions on one part of the plurality of wire-like transmission members 12 flattened by the sheet material 30 at an interval along the longitudinal direction of the wire-like transmission member 12. Particularly, in the example illustrated in FIG. 9, the reinforcement member 80 is provided in two positions on both end portion sides on one part of the plurality of wire-like transmission members 12 flattened by the sheet material 30.

According to such a wiring member 410, the reinforcement member 80 is provided, thus the state where the plurality of wire-like transmission members 12 are flattened by the sheet material 30 can be easily maintained.

[Embodiment 6]

Figure 10:
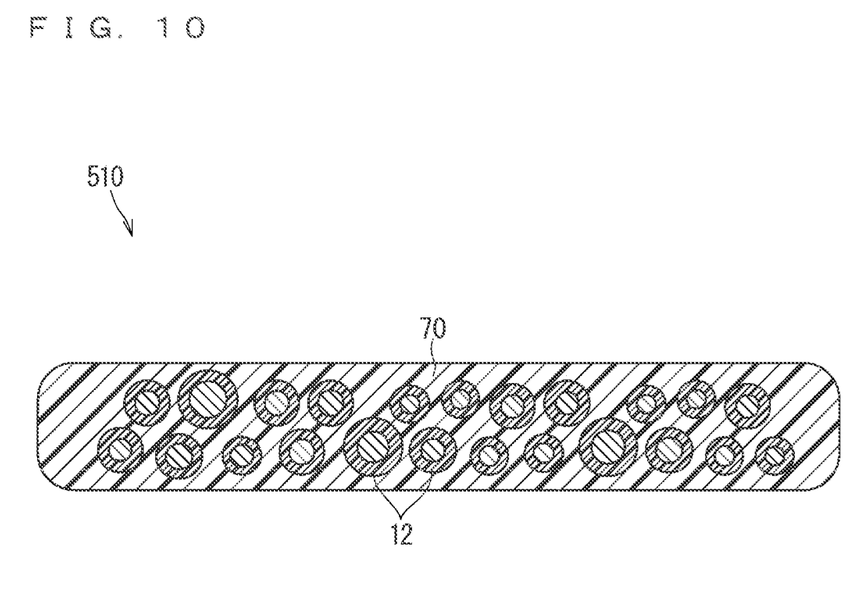
FIG. 10 is a plan view illustrating a wiring member according to an embodiment 6.

A wiring member according to an embodiment 6 is described. FIG. 10 is a plan view illustrating a wiring member 510 according to the embodiment 6.

This wiring member 510 indicates a case where a second flattening member 70 is used as the flattening member.

The second flattening member 70 is a member molded in a state where the plurality of wire-like transmission members 12 are embedded in the second flattening member 70 as described above. That is to say, the second flattening member 70 is a member integrally molded with the plurality of wire-like transmission members 12.

The wiring member 510 can be formed by filling a mold, which houses apart of the plurality of wire-like transmission members 12 along the longitudinal direction therein, with a material, that is a so-called insert molding. The material is not particularly limited. For example, PE, PVC, PU, PP, PET, rubber, and silicone can be used as the material.

At this time, when the material is soft, the wiring member 510 can be bent in a thickness direction in the manner similar to the wiring member 10 described above. For example, elastomer such as natural rubber and silicon rubber, a soft resin material such as soft PVC, or foam resin can be used as the soft material.

When the material is hard, the wiring member 510 can regulate the route in the manner similar to the wiring members 210 and 210A described above. For example, PP can be used as the hard material.

Such a wiring member 510 includes the second flattening member 70 integrally molded with the wire-like transmission member 12, thus the flattening member hardly comes out from the wire-like transmission member 12 compared with the case where the flattening member is formed separately.

The configurations described in the embodiments and modification examples thereof can be appropriately combined as long as they are not contradictory. For example, different flattening members may be adopted in a plurality of regions along the longitudinal direction of the wire-like transmission member 12, respectively. For example, plural different flattening members may also be adopted in one region along the longitudinal direction of the wire-like transmission member 12.

EXPLANATION OF REFERENCE SIGNS

10, 10A, 110, 210, 210A, 310, 410, 510 wiring member
12 electrical wire (wire-like transmission member)

14 core wire (transmission wire body)
16 insulating covering (coat)
20 group
22 banding member
30 sheet material
40 grooved housing member
42 groove
50, 50A route regulation member
51 bottom part
52 sidewall part
53 bottom part
54 cover part
55 connection part
56 sidewall part
60 banding connection member
62 connection member
64 crossing part
70 second flattening member
80 reinforcement member

The invention claimed is:

1. A wiring member, comprising:
a plurality of wire-like transmission members each including a transmission wire body and a coat covering the transmission wire body; and
a flattening member keeping the plurality of wire-like transmission members in a flat state, wherein
the plurality of wire-like transmission members are divided into a plurality of groups each including one or a plurality of wire-like transmission members,
at least one group including the plurality of wire-like transmission members in the plurality of groups is bundled by a banding member,
the banding member and the flattening member are separate from each other, and only one or some of the plurality of groups are banded by the banding member,
the flattening member includes a first flattening member which is a member formed separately from the plurality of wire-like transmission members,
the first flattening member includes a sheet material having flexibility capable of being bent in a thickness direction and sandwiching the plurality of wire-like transmission members, and
the banding member is not bonded to the sheet material and the coat of the wire-like transmission member in a group which is not banded by the banding member is not bonded to the sheet material.

2. The wiring member according to claim 1, further comprising
a reinforcement member reinforcing a part of a portion flattened by the sheet material.

3. The wiring member according to claim 2, wherein
a dimension of the reinforcement member in a longitudinal direction of the plurality of wire-like transmission members is smaller than a dimension of the sheet material in the longitudinal direction, and
a dimension of the reinforcement member in a width direction of the plurality of wire-like transmission members is greater than a dimension of the sheet material in the width direction.

4. The wiring member according to claim 1, wherein
the first flattening member includes a grooved housing member in which a plurality of grooves housing some of the plurality of wire-like transmission members are formed.

5. The wiring member according to claim 1, wherein
the first flattening member includes a route regulation member having stiffness capable of regulating routes of the plurality of wire-like transmission members.

6. The wiring member according to claim 1, wherein
the first flattening member includes a banding connection member binding and connecting each group while dividing the plurality of wire-like transmission members into the plurality of groups.

7. The wiring member according to claim 6, wherein the banding connection member passes between the plurality of groups in a zig-zag manner along a longitudinal direction of the plurality of wire-like transmission members.

8. The wiring member according to claim 6, wherein
the banding connection member extends to cross at least a first group and a second group of the plurality groups of wire-like transmission members, the first group and the second group being adjacent to each other, and
the banding connection member extends from the bottom of the first group toward the top of the second group.

9. The wiring member according to claim 1, wherein
the flattening member includes a second flattening member which is a member molded in a state where the plurality of wire-like transmission members are embedded in the second flattening member.

10. The wiring member according to claim 1, wherein
a groove is not formed in the sheet material which is the first flattening member.

11. The wiring member according to claim 1, wherein the first flattening member comprises two first flattening members that sandwich the plurality of wire-like transmission members.

* * * * *